UNITED STATES PATENT OFFICE.

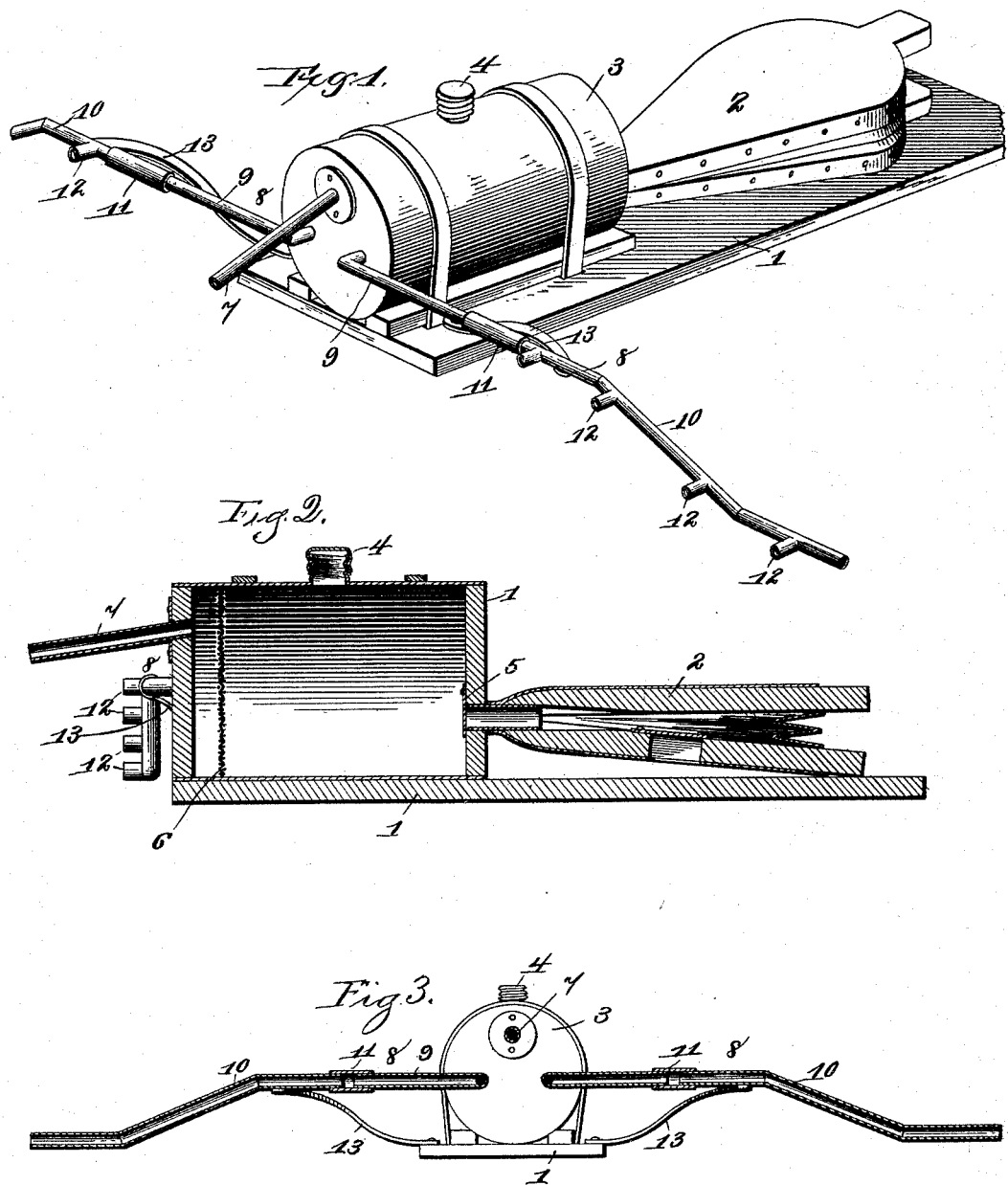

REUBEN J. TALLEY, OF LEESVILLE, TEXAS, ASSIGNOR OF ONE-HALF TO S. P. GORDEN, OF SAME PLACE.

INSECTICIDE-DISTRIBUTER.

SPECIFICATION forming part of Letters Patent No. 483,269, dated September 27, 1892.

Application filed June 11, 1892. Serial No. 436,379. (No model.)

*To all whom it may concern:*

Be it known that I, REUBEN J. TALLEY, a citizen of the United States, residing at Leesville, in the county of Gonzales and State of Texas, have invented a new and useful Insecticide-Distributer, of which the following is a specification.

The invention relates to improvements in insecticide-distributers.

The object of the present invention is to provide a simple and comparatively inexpensive insecticide-distributer adapted to spread poison broadcast.

The invention consists in the construction and novel combination and arrangement of parts hereinafter fully described, illustrated in the accompanying drawings, and pointed out in the claim hereto appended.

In the drawings, Figure 1 is a perspective view of an insecticide-distributer constructed in accordance with this invention. Fig. 2 is a central longitudinal sectional view. Fig. 3 is a front elevation, partly in section.

Like numerals of reference indicate corresponding parts in all the figures of the drawings.

1 designates a rectangular platform or base adapted to be placed on a vehicle or running-gear and having mounted upon it a bellows 2 and a cylinder 3, arranged in front of the bellows and adapted to contain the poison to be distributed and provided on its upper side with a filling-orifice, which is closed by a screw-cap 4. The bellows 2 discharges into the inner end of the cylinder, which is provided with an inwardly-opening valve 5 to prevent any of the poison entering the bellows. The cylinder 3 is provided at its front end with a transverse foraminous diaphragm 6, which is constructed of wire-gauze or similar material and which causes the poison to be finally divided before entering the forwardly and laterally extending discharge-tubes 7 and 8. The outer end of the forwardly-extending discharge-tubes serves as a nozzle. The laterally-extending discharge-tubes are composed of inner and outer sections 9 and 10, which are connected by flexible coupling 11, and the outer sections 10 are provided with a series of bends and a series of corresponding discharge-nozzles 12, which are arranged at different heights, whereby the poison will be distributed over a great space. The coupling 11 is preferably constructed of rubber or similar elastic material, and the outer section 10 is supported and is prevented from sagging by a curved brace 13, constructed of steel or other suitable material and pivotally attached to the outer section and to the base or platform 1. The flexible coupling 11 permits the outer section to be moved back or swung horizontally in case the section should come in contact with a tree or other obstructions to prevent the breaking of the laterally-extending discharge-tubes, and the pivoted braces will permit such a movement.

It will be seen that the insecticide-distributer is simple and inexpensive in construction, strong, and durable, and that it is capable of distributing poison over a great space in a short time. The poison is adapted to be sprinkled on plants in the usual manner to kill bugs and other insects.

What I claim is—

The combination of a base, a bellows mounted thereon, a receptacle arranged in advance of the bellows and adapted to contain poison to be distributed, a forwardly-projecting discharge-tube, laterally-extending discharge-tubes comprising inner rigid sections, outer rigid sections having series of discharge-nozzles, and flexible couplings connecting the rigid sections, and the braces having their inner ends pivoted to the base and their outer ends pivoted to the outer sections and supporting the same, substantially as described.

In testimony that I claim the foregoing as my own I have hereto affixed my signature in the presence of two witnesses.

REUBEN J. TALLEY.

Witnesses:
S. G. MCGUFFIN,
D. H. BROWN.